United States Patent [19]
Ohmori et al.

[11] Patent Number: 5,477,417
[45] Date of Patent: Dec. 19, 1995

[54] ELECTRONIC EQUIPMENT HAVING INTEGRATED CIRCUIT DEVICE AND TEMPERATURE SENSOR

[75] Inventors: Akimitsu Ohmori; Morishige Kinjo, both of Tokyo, Japan

[73] Assignee: Kabushiki Kaisha Toshiba, Kawasaki, Japan

[21] Appl. No.: 113,848

[22] Filed: Aug. 27, 1993

[30] Foreign Application Priority Data

Aug. 28, 1992 [JP] Japan .................................. 4-229019
Oct. 15, 1992 [JP] Japan .................................. 4-277472

[51] Int. Cl.$^6$ .................................................. G06F 15/20
[52] U.S. Cl. ............................................ 361/695; 327/512
[58] Field of Search ................................. 257/467, 468, 257/469, 470; 307/296.3, 303, 303.2, 303.3; 364/550, 707; 361/695, 689, 694, 698, 699

[56] References Cited

U.S. PATENT DOCUMENTS

| | | | |
|---|---|---|---|
| 4,571,728 | 2/1986 | Yoshikawa | 372/36 |
| 4,812,733 | 3/1989 | Tobey | 364/488 |
| 4,823,290 | 4/1989 | Fasack et al. | 364/550 |
| 4,873,649 | 10/1989 | Grald et al. | 364/552 |
| 4,935,864 | 6/1990 | Schmidt et al. | 363/141 |
| 4,967,568 | 11/1990 | Harden, Jr. et al. | 62/155 |
| 5,021,679 | 6/1991 | Fairbanks et al. | 364/707 |
| 5,222,239 | 6/1993 | Rosch | 364/707 |
| 5,237,697 | 8/1993 | Wakano | 364/707 |
| 5,287,292 | 2/1994 | Kenney et al. | 364/550 |

OTHER PUBLICATIONS

Mahalingam, Mali, "Thermal Design of Various of IC Packages for Lowering a Junction Temperature", Nikkei Electronics 1986, 4. 21 (No. 393).

Shaland, Alex, et al., "Circuit Protectors: Miniature But Mighty", Machine Design/Asia–Pacific, Spring 1992, pp. 22–26.

Kaye, Harvey, "An Optimal Junction Temperature of IC's is found from a planned MTBF as Well as the Number and Quality of IC's Used", Nikkei Electronics, 9.9.

Primary Examiner—Peter S. Wong
Assistant Examiner—Shawn Riley
Attorney, Agent, or Firm—Loeb and Loeb

[57] ABSTRACT

An electronic equipment such as a CPU body of a computer system includes a circuit board section, an abnormal temperature detecting section, a determining section, a refrigerant cooling system, and an alarm unit. The circuit board section for effecting preset signal processings includes a printed circuit board on which at least one PTC (Positive Temperature Coefficient) thermistor built-in type integrated circuit device including a package, an integrated circuit chip disposed in the package, a PTC thermistor disposed between the package and the integrated circuit chip, and an electrical deriving member disposed in the package, for transferring a signal with respect to the integrated circuit chip and PTC thermistor, and electronic elements are mounted. The abnormal temperature detecting section outputs an abnormal temperature signal when an output of the PTC thermistor has exceeded a preset value. The determining section determines an abnormal state of the temperature sensing element built-in type integrated circuit device according to an output of the abnormal temperature detecting section. The refrigerant cooling system and alarm unit are controlled based on the result of determination by the determining section.

5 Claims, 10 Drawing Sheets

ELECTRONIC EQUIPMENT HAVING INTEGRATED CIRCUIT DEVICE AND TEMPERATURE SENSOR

BACKGROUND OF THE INVENTION

1. Field of the Invention

This invention relates to an integrated circuit device and to electronic equipment such as a computer having the circuit device.

2. Description of the Related Art

The performance and reliability of integrated circuit devices are closely related to the temperatures of the circuit devices. Likewise, the performance and reliability of electronic equipment including a plurality of printed circuit boards each having a large number of integrated circuit devices of the above type mounted thereon is dependent on the temperature characteristics thereof. Such electronic equipment includes the CPU of a computer system, various terminal devices, and communication devices, for example.

Conventionally, this type of electronic equipment includes a plurality of printed circuit boards arranged in a frame and each having a large number of integrated circuit devices mounted thereon. Further, in the frame, a forced cooling means is provided. The forced cooling means is used to control the temperatures of the integrated circuit devices in the electronic equipment (frame) within a limited temperature range. As the forced cooling means, a duct and fan are provided. For example, an air inlet duct is provided in the front surface portion of a casing and a fan is disposed on the upper portion of the casing to provide a casing structure which creates a forced air flow in the casing. Circuit boards having integrated circuits mounted thereon are placed in the forced air flow so as to attain forced air cooling for the circuit boards.

Conventionally, the temperature control of the integrated circuit devices and electronic equipments includes a main factor of carrying away heat from the circuit board itself in the casing with high efficiency or carrying away heat from integrated circuit devices mounted on the circuit board with high efficiency. In a case where the performance of the electronic equipment is lowered or the electronic equipment is erroneously operated, it is difficult to determine that such an abnormal condition occurs because of abnormal temperature or abnormal power source voltage and thus detect the reason why such an abnormal condition occurs. For this reason, it is difficult to restore the equipment to the normal condition.

SUMMARY OF THE INVENTION

An object of this invention is to provide an integrated circuit device capable of controlling abnormal temperatures thereof.

Another object of this invention is to provide an electronic equipment capable of rapidly determining whether or not an abnormal condition is caused by the abnormal temperature of an integrated circuit device when the abnormal condition such as deterioration in the performance of the equipment or erroneous operation thereof has occurred and effecting an adequate aftertreatment.

The above object can be attained by an integrated circuit device comprising a package; an integrated circuit chip disposed in the package; a temperature sensor disposed in the package; and an electrical deriving member disposed in the package, for effecting signal transfer with respect to the integrated circuit chip.

The above object can be attained by an electronic equipment comprising a circuit board section for effecting a preset signal process, and including a printed circuit board on which at least one temperature sensing element built-in type integrated circuit device including a package, an integrated circuit chip disposed in the package, a temperature sensing element disposed in the package, for outputting a signal in the form of a resistance change converted from a temperature change, and an electrical deriving member disposed in the package, for effecting signal transfer with respect to the integrated circuit chip and temperature sensing element, and electronic elements are mounted; temperature controlling means for controlling the temperature of the circuit board section; and control means for controlling at least one of the temperature controlling means and circuit board section according to an output of the temperature sensing element.

Further, the above object can be attained by an electronic equipment comprising a circuit board section for effecting a preset signal process, and including a printed circuit board on which at least one abnormal temperature detector built-in type integrated circuit device including a package, an integrated circuit chip disposed in the package, a temperature sensing element disposed in the package, for outputting a signal in the form of a resistance change converted from a temperature change, an abnormal temperature detecting chip for outputting an abnormal temperature signal when an output of the temperature sensing element has exceeded a preset value, and an electrical deriving member disposed in the package, for effecting signal transfer with respect to the integrated circuit chip, temperature sensing element and abnormal temperature detecting chip, and electronic elements are mounted; temperature controlling means for controlling the temperature of the circuit board section; and determining means for determining at least one of the abnormal temperature state in the circuit board section and the abnormal temperature state of the abnormal temperature detector built-in type integrated circuit device according to an output of the abnormal temperature detecting chip and controlling at least one of the temperature controlling means and the circuit board section based one the result of determination.

Further, the above object can be attained by an electronic equipment comprising a circuit board section for effecting a preset signal process, and including a printed circuit board on which at least one PTC (Positive Temperature Coefficient) thermistor built-in type integrated circuit device including a package, an integrated circuit chip disposed in the package, a PTC thermistor disposed between the package and the integrated circuit chip, and an electrical deriving member disposed in the package, for transferring a signal with respect to the integrated circuit chip and PTC thermistor, and electronic elements are mounted; an abnormal temperature detecting section for outputting an abnormal temperature signal when an output of the PTC thermistor has exceeded a preset value; determining means for determining an abnormal state of the temperature sensing element built-in type integrated circuit device according to an output of the abnormal temperature detecting section; a refrigerant cooling system including a refrigerant inlet duct, a refrigerant flowing path, and a forced exhaust fan mechanism controlled based on the result of determination by the determining section; and an alarm unit controlled based on the result of determination by the determining section.

With the above construction, since the temperature sensing element mounted in the package together with the element chip exhibits a large change in its resistance when it detects a temperature higher than the preset temperature, an abnormal temperature can be determined when such a large resistance change has occurred, and therefore, the abnormal temperature state of the element can be controlled.

Further, since at least one of a plurality of integrated circuit elements of the electronic equipment is constructed such that the temperature sensing element which exhibits a large change in its resistance when sensing a temperature higher than the preset temperature is mounted in the package together with the element chip, an adequate process is effected to cope with the abnormal temperature state of the integrated circuit element when the integrated circuit element senses a temperature higher than the preset temperature and exhibits a large resistance. Thus, when the performance of the equipment is degraded and the equipment is erroneously operated, whether the abnormal condition is caused by the abnormal temperature of the integrated circuit element or not can be rapidly determined and an adequate after-treatment can be effected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
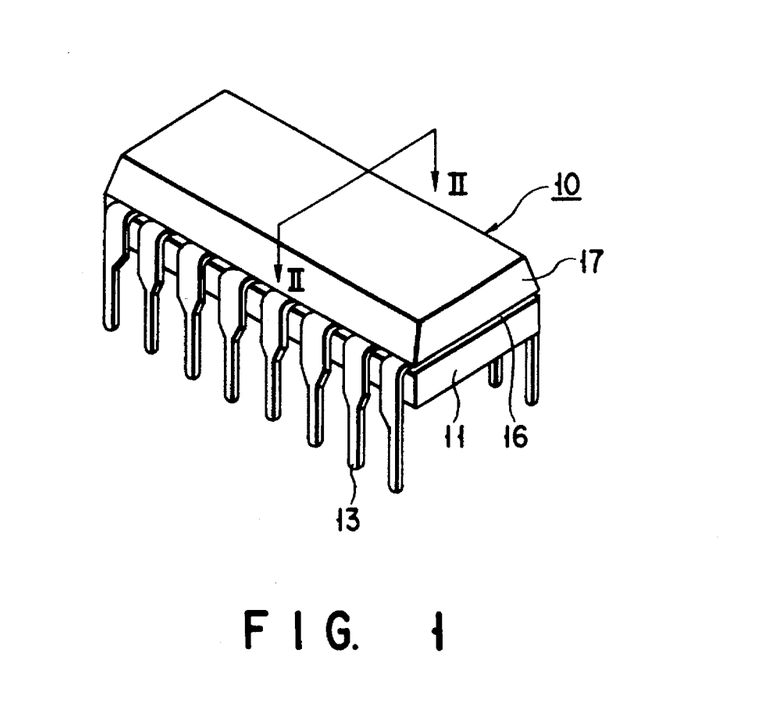
FIG. 1 is a perspective view of a semiconductor integrated circuit device according to one embodiment of this invention.
Figure 2:
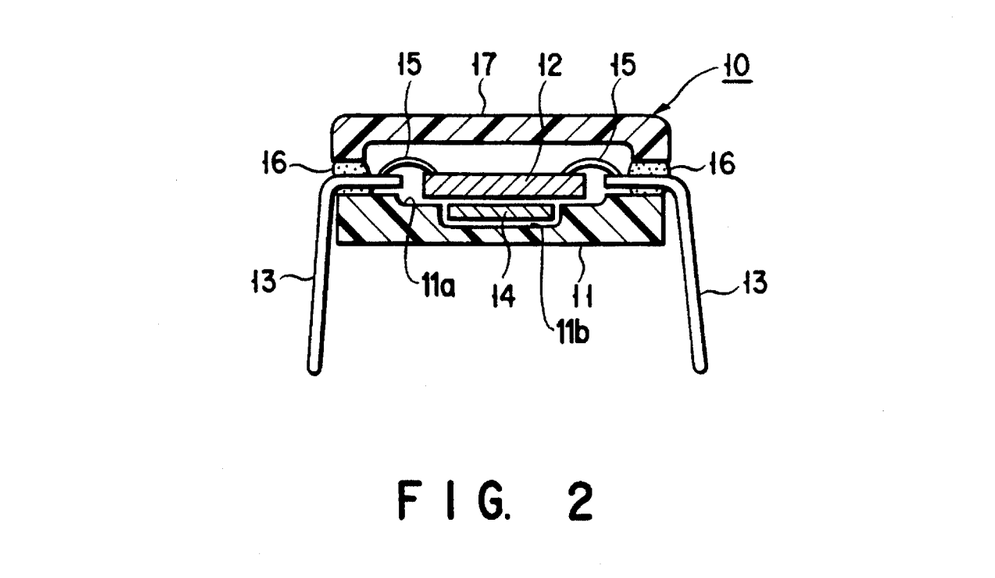
FIG. 2 is a cross sectional view taken along the II—II line in FIG. 1.
Figure 3:
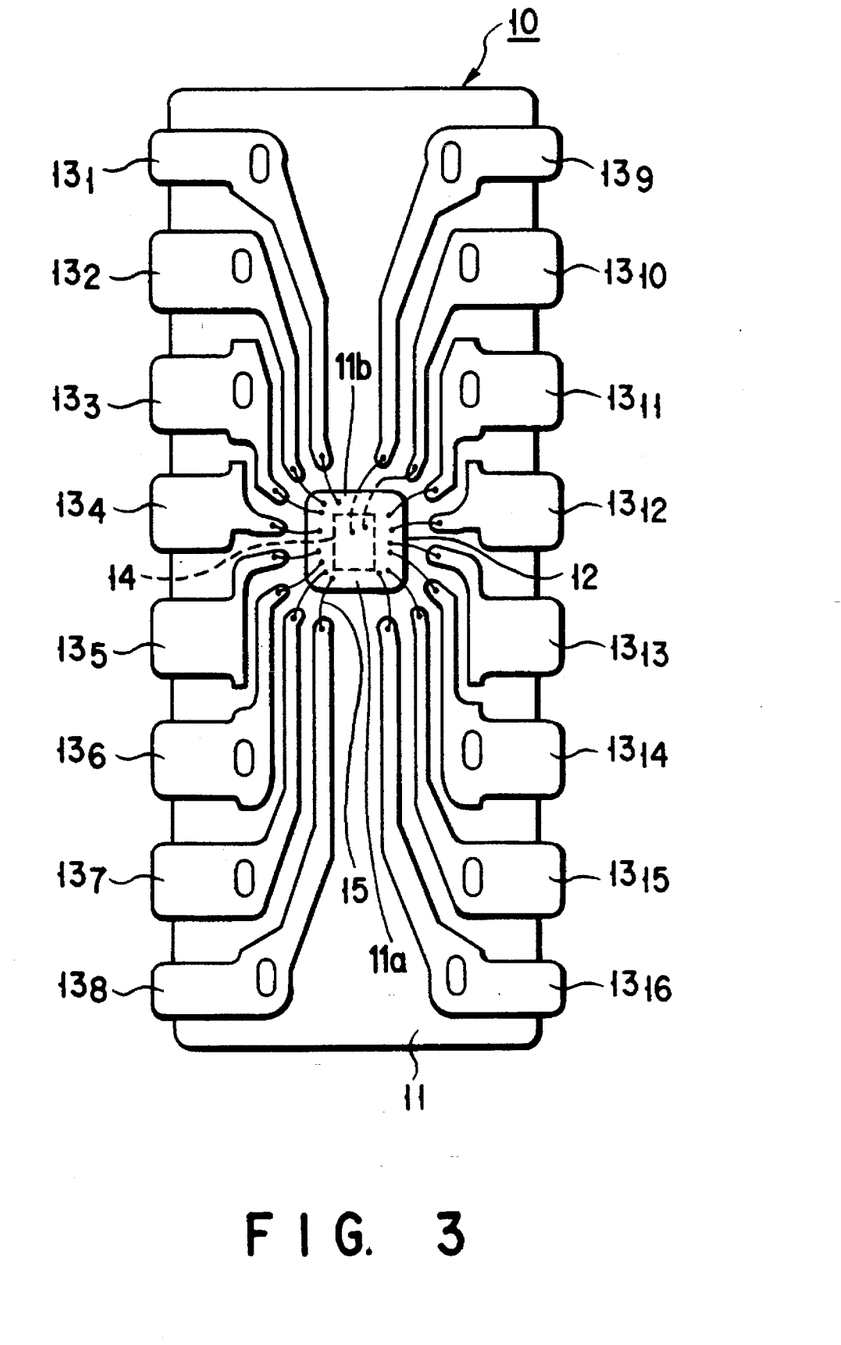
FIG. 3 is a plan view showing the semiconductor integrated circuit device according to one embodiment of this invention shown in FIG. 1 with the sealing material and lid thereof removed.

There will now be described an integrated circuit device according to one embodiment of this invention with reference to FIGS. 1 to 6. As shown in FIG. 1, the integrated circuit device to which this invention is applied is a so-called dual-in-line type 16-pin semiconductor integrated circuit device 10. As shown in FIG. 2, the semiconductor integrated circuit device 10 includes a package body 11 on which a chip disposing portion 11a and a temperature sensing element disposing portion 11b are formed, an integrated circuit chip 12, a lead terminal bodies 13 ($13_1$, - - - , $13_{16}$) having a large number of (16, in this embodiment) lead terminals, a temperature sensing element 14, a large number of (16, in this embodiment) connection lines 15, a sealing material 16, and a lid 17. The package body 11, sealing material 16 and lid 17 constitute a package. The lead terminal bodies 13 and connection lines 15 constitute an electrical deriving member. The positional relation on a plane between the integrated circuit chip 12, lead terminals 13 and temperature sensing element 14 on the package body 11 can be easily understood by referring to FIG. 3. The integrated circuit chip 12 is connected to the lead terminal bodies $13_1$, $13_2$, $13_3$, $13_4$, $13_5$, $13_6$, $13_7$, $13_8$, $13_{11}$, $13_{12}$, $13_{13}$, $13_{14}$, $13_{15}$, $13_{16}$ via the connection lines 15, respectively. The temperature sensing element 14 is connected to the lead terminal bodies $13_9$, $13_{10}$ via the two connection lines 15, respectively.

A chip mounting portion 11a which is a concave portion is formed in substantially the central portion of the package body 11. A temperature sensing element mounting portion 11b which is a concave portion is formed in substantially the central portion of the chip mounting portion 11a. The temperature sensing element is bonded to the concave portion of the temperature sensing element mounting portion 11b by a preset bonding method. Further, the integrated circuit chip 12 is bonded to the chip mounting portion 11a by a preset bonding method. Therefore, in the package body 11, the temperature sensing element 14 is disposed between the integrated circuit chip 12 and the package body 11. Further, the temperature sensing element 14 is disposed near the integrated circuit chip 12. If necessary, an electrically insulating material may be disposed between the integrated circuit chip 12 and the temperature sensing element 14.

The lead terminal bodies 13 are disposed on the package body 11. The integrated circuit chip 12 and the temperature sensing element 14 are connected to the respective lead terminals of the lead terminal bodies 13 via the connection lines 15. The upper portion of the package body 11 is sealed by the lid 17 with the sealing material 16 disposed therebetween.

Figure 4:
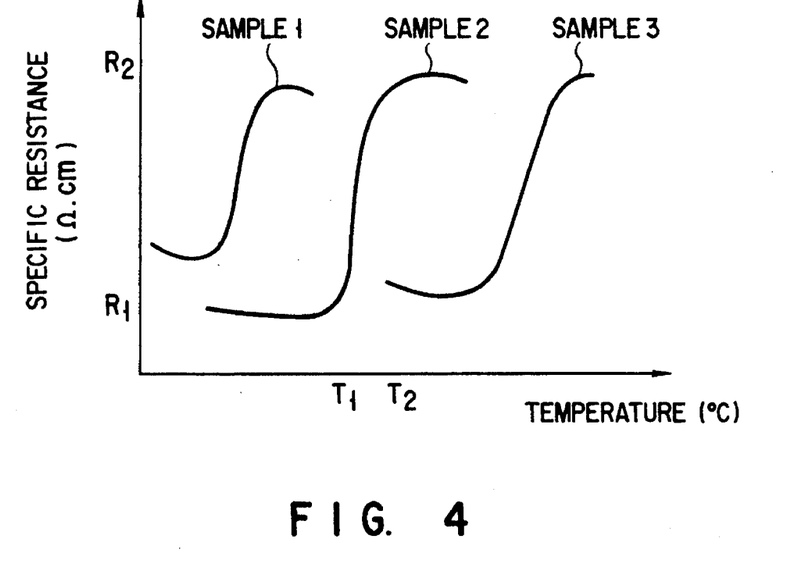
FIG. 4 is a characteristic diagram of a temperature element.

As the temperature sensing element 14 in this embodiment, a PTC (Positive Temperature Coefficient) thermistor having such characteristics as shown by samples 1, 2, 3 in FIG. 4, for example, is used. A thermistor which is a semiconductor temperature sensing element formed of metal oxide includes an NTC (Negative Temperature Coefficient) thermistor in addition to the PTC thermistor used in this embodiment.

The PTC thermistor used in this embodiment contains $BaTiO_3$ as a main component, exhibits such a characteristic that the electrical resistance thereof exponentially increases with a rise in temperature, and more specifically, it is a positive temperature characteristic element having such a characteristic that it exhibits a low resistance (not larger than $R_1$) at temperatures lower than a preset temperature ($T_1$) in the case of sample 2, the resistance thereof exponentially rises with a rise in temperature higher than the preset temperature, and the resistance thereof reaches an upper limit value ($R_2$) at a temperature ($T_2$). The NTC (Negative Temperature Coefficient) thermistor is a negative temperature characteristic element containing NiO, CoO, MnO as a main component.

Figure 5:
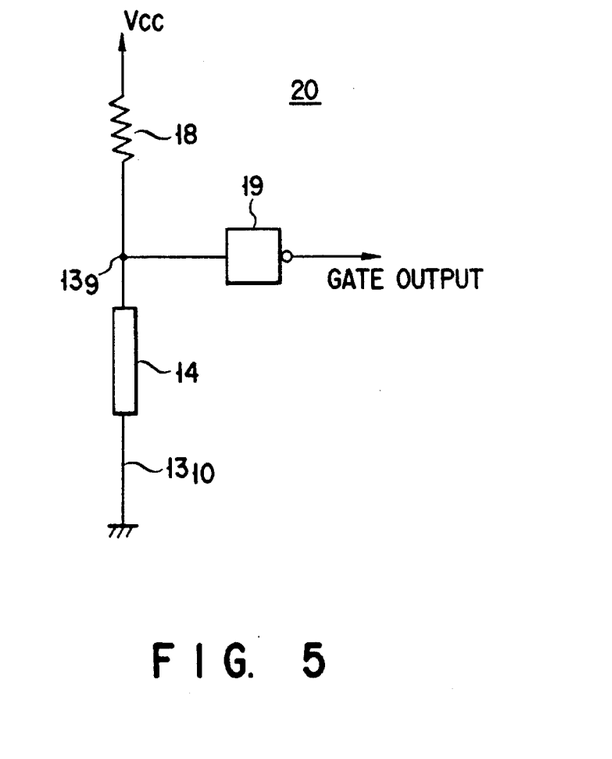
FIG. 5 is a circuit diagram showing one example of an abnormal temperature detecting section.

According to the integrated circuit element 10 of this embodiment with the above construction, since the temperature sensing element 14 is connected to the lead terminal bodies $13_9$, $13_{10}$ via the two connection lines 15, a variation in the resistance of the temperature sensing element 14 can be read via the lead terminal bodies $13_9$, $13_{10}$. More specifically, as shown in FIG. 5, an abnormal temperature detecting section 20 including the temperature sensing element 14 is constructed. That is, the lead terminal body $13_9$ which is connected to the temperature sensing element 14 is connected to one end of a fixed resistor 18 and one end of an inverter gate 19 and the lead terminal body $13_{10}$ which is connected to the temperature sensing element 14 is grounded. The other end of the fixed resistor 18 is connected to a power source $V_{CC}$ (not shown). The other end of the inverter gate 19 is used as an output terminal of the abnormal temperature detecting section 20. A gate output is derived from the output terminal. It is also possible to solve noise problems caused by fluctuation in the power source voltage by using an inverter gate having a hysteresis characteristic as the inverter gate 19.

Next, the operation of the abnormal temperature detecting section 20 with the above construction is explained. That is, the integrated circuit element 10 of this embodiment is mounted on a printed circuit board (not shown) and driven in a preset manner. The driven integrated circuit device 10 generates heat. In this case, since the temperature sensing element 14 is disposed near the integrated circuit chip 12 which is a heat generating body, heat generated from the integrated circuit chip 12 influences on the temperature sensing element 14. As shown in FIG. 5, since the temperature sensing element 14 is connected to the power source $V_{CC}$, a current defined by the resistance of the temperature sensing element 14 flows in a series circuit of the power source $V_{CC}$, temperature sensing element 14 and the ground.

Figure 6:
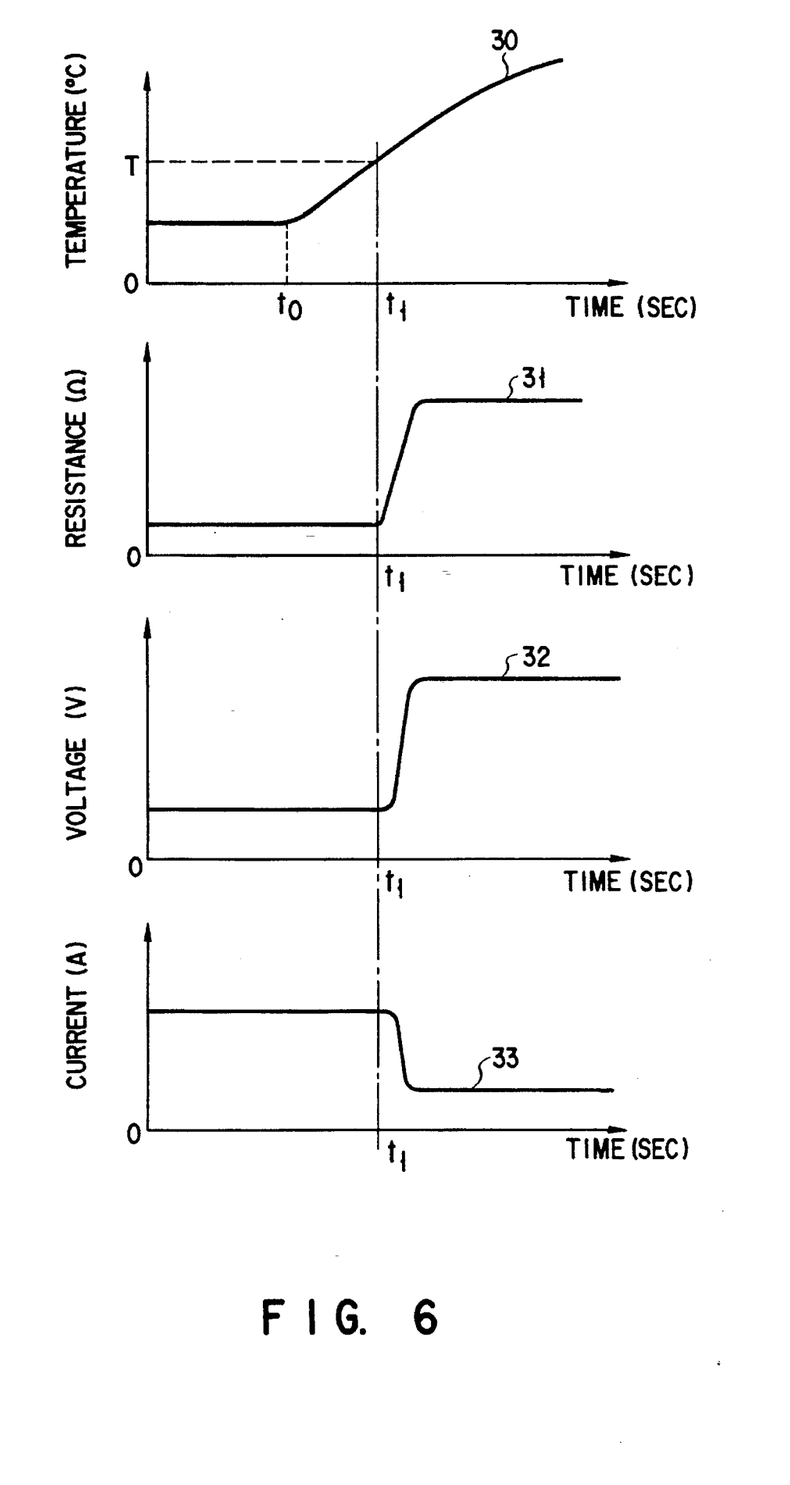
FIG. 6 is a waveform diagram showing waveforms in various portions of the abnormal temperature detecting section.

In this case, since the temperature sensing element 14 mounted on the integrated circuit device 10 is disposed near the integrated circuit chip 12 which is a heat generating body, it is influenced by heat generated from the integrated circuit chip 12. Assume that the temperature sensing element has a temperature characteristic indicated by a numeral 30 in FIG. 6, for example, and the resistance of the temperature sensing element 14 has a resistance characteristic indicated by a numeral 31 in FIG. 6, for example. In the temperature characteristic indicated by the numeral 30, the temperature is low before the time reaches $t_0$ and the temperature is high when and after the time has reached $t_0$. The temperature T at time $t_1$ is determined as a set temperature value. In FIG. 6, a numeral 32 indicates the potential characteristic of the lead terminal body $13_9$ and a numeral 33 indicates an output potential characteristic of the inverter gate 19.

As shown in FIG. 6, when the temperature of the temperature sensing element 14 becomes T, an output of the abnormal temperature detecting section 20 which is an output potential of the inverter gate 19 is changed from a high potential (ON) to a low potential (OFF) and thus the abnormal temperature state of the integrated circuit device 10 can be detected based on the OFF output of the abnormal temperature detecting section 20.

As described above, according to this invention, since the temperature sensing element 14 mounted on the package body 11 together with the integrated circuit chip 12 exhibits a large variation in its resistance when sensing temperatures higher than a preset temperature, it becomes possible to determine that an abnormal temperature state has occurred when the large resistance variation is indicated, and as a result, an abnormal temperature state of the integrated circuit device 10 can be controlled. Of course, when a large number of integrated circuit devices 10 are used, the abnormal temperature state of each integrated circuit device can be controlled.

In the above embodiment, the positional relation between the integrated circuit chip 12 and the temperature sensing element 14 mounted on the package body 11 is set such that the temperature sensing element 14 is arranged directly below the integrated circuit chip 12, but it is not limited to this structure, and various other structures in which the temperature sensing element 14 may be influenced by heat generated from the integrated circuit chip 12, for example, a structure in which the temperature sensing element 14 is disposed on the side portion of the integrated circuit chip 12 or a structure in which the temperature sensing element 14 is disposed on the edge portion of the integrated circuit chip 12 can be used.

Further, an integrated circuit device to which this invention is applied is not limited to the dual-in-line type, but various package types of semiconductor devices (integrated circuit devices and discrete devices) can be used.

The temperature sensing element 14 is not limited to the PTC thermistor and other small-sized sensors which can be disposed in a package and exhibit a large resistance variation when sensing temperatures higher than a preset temperature can be used.

Further, an output of the abnormal temperature detecting section 20 is derived in the form of negative logic output in which an output is indicated by OFF, but it is also possible to construct a circuit which produces a positive logic output in which an output is indicated by ON. Of course, the abnormal temperature detecting section 20 is not limited to the circuit shown in FIG. 5.

Figure 7:
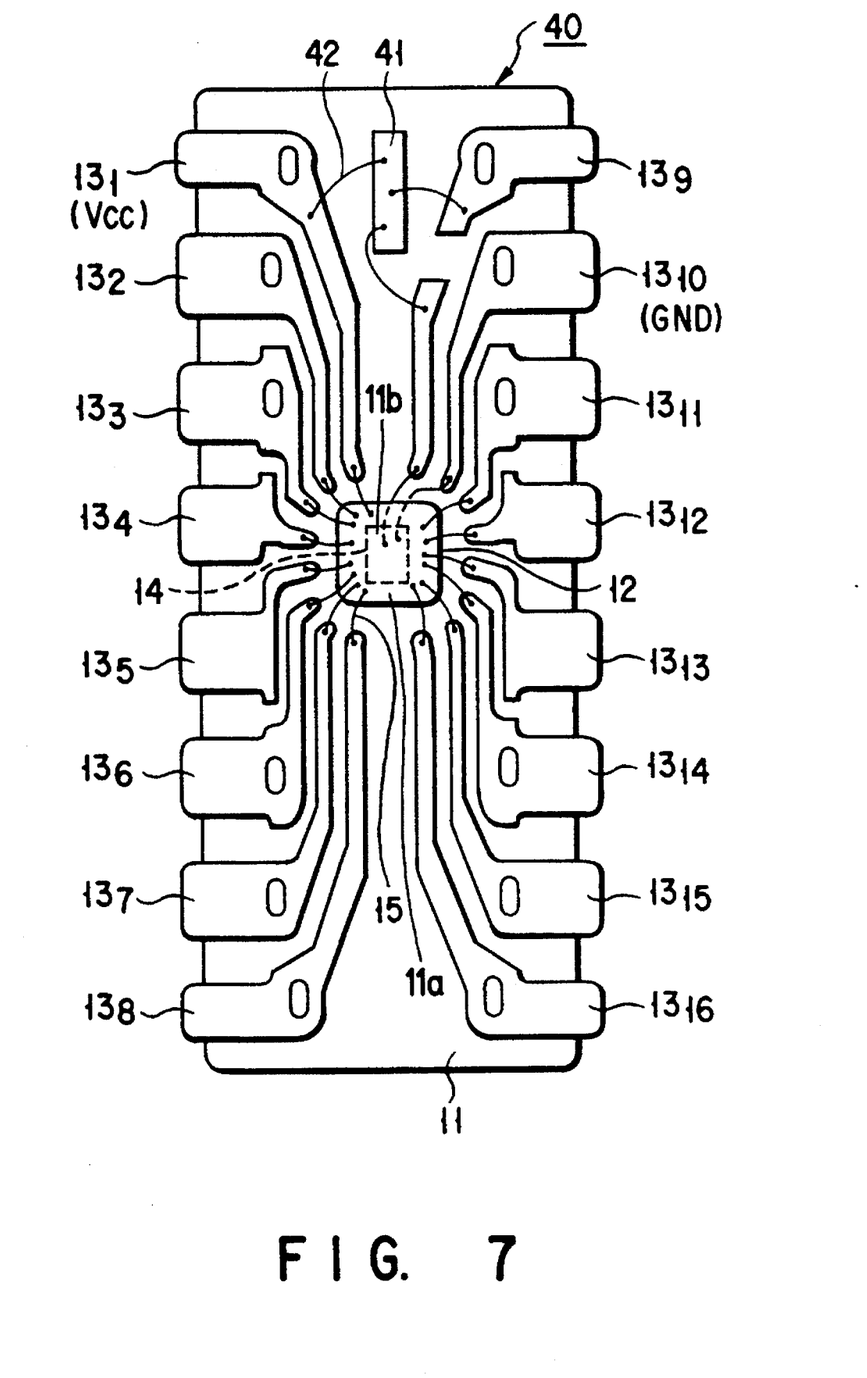
FIG. 7 is a plan view showing a semiconductor integrated circuit device according to another embodiment of this invention with the sealing material and lid thereof removed.

In the above embodiment, the temperature sensing element 14 which is one of the elements constituting the abnormal temperature detecting section 20 is mounted in the package of the integrated circuit device 10, and the other elements are not mounted in the integrated circuit device 10. However, it is also possible to mount all of the elements including the temperature sensing element 14 in the package of the integrated circuit device 10. In this case, the power source $V_{CC}$ and the ground may be connected to corresponding terminals in the integrated circuit chip 12. An integrated circuit device 40 with the above construction is explained with reference to FIG. 7. An abnormal temperature signal output chip 41 is disposed in an available space in a package body 11. The abnormal temperature signal output chip 41 is a chip including the resistor 18 and the gate circuit 19 shown in FIG. 5. Assume that the power source $V_{CC}$ is a terminal $13_1$, the abnormal temperature signal output terminal is a terminal $13_9$, and the ground terminal is a terminal $13_{10}$. The chip 41 is connected to the terminals $13_1$, $13_9$, $13_{10}$ via connection lines 42. Therefore, the integrated circuit device 40 is formed as a device which contains the abnormal temperature detecting section 20 including the temperature sensing element 14 together with the integrated circuit chip 12 in the package.

According to the above integrated circuit device 40, the same operation as that of the integrated circuit device 10 is effected and it is compact.

Figure 8:
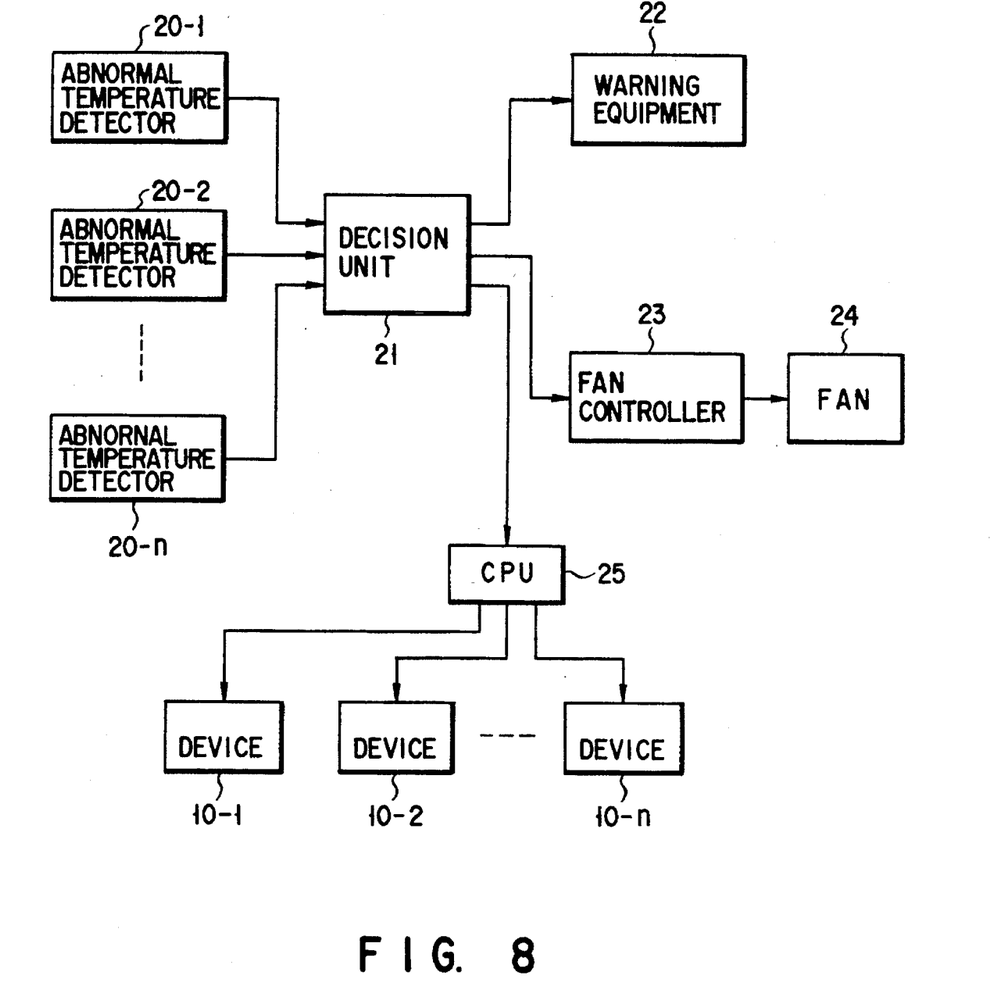
FIG. 8 is a circuit diagram showing the main portion of an electronic equipment according to one embodiment of this invention.

Next, an electronic equipment having a plurality of integrated circuit devices 10 according to one embodiment of this invention mounted thereon and effecting a preset signal processing by use of the plurality of integrated circuit devices 10 is explained with reference to FIG. 8. As shown in FIG. 8, one or more circuit boards are disposed in a casing (not shown) and a large number of integrated circuit devices are mounted on each circuit board. Integrated circuit devices of n among the large number of integrated circuit devices are integrated circuit devices 10 having temperature sensing elements 14. Abnormal temperature detecting sections 20 (20-1, 20-2, - - - , 20-n) of n are provided for the respective n integrated circuit devices 10 (10-1, 10-2, - - - , 10-n). Outputs of the abnormal temperature detecting sections 20 (20-1, 20-2, - - - , 20-n) are supplied to a determining section 21. The determining section 21 has one or more determining conditions and processes outputs from the abnormal temperature detecting sections 20 (20-1, 20-2, - - - , 20-n) according to the determining conditions.

Figure 9:
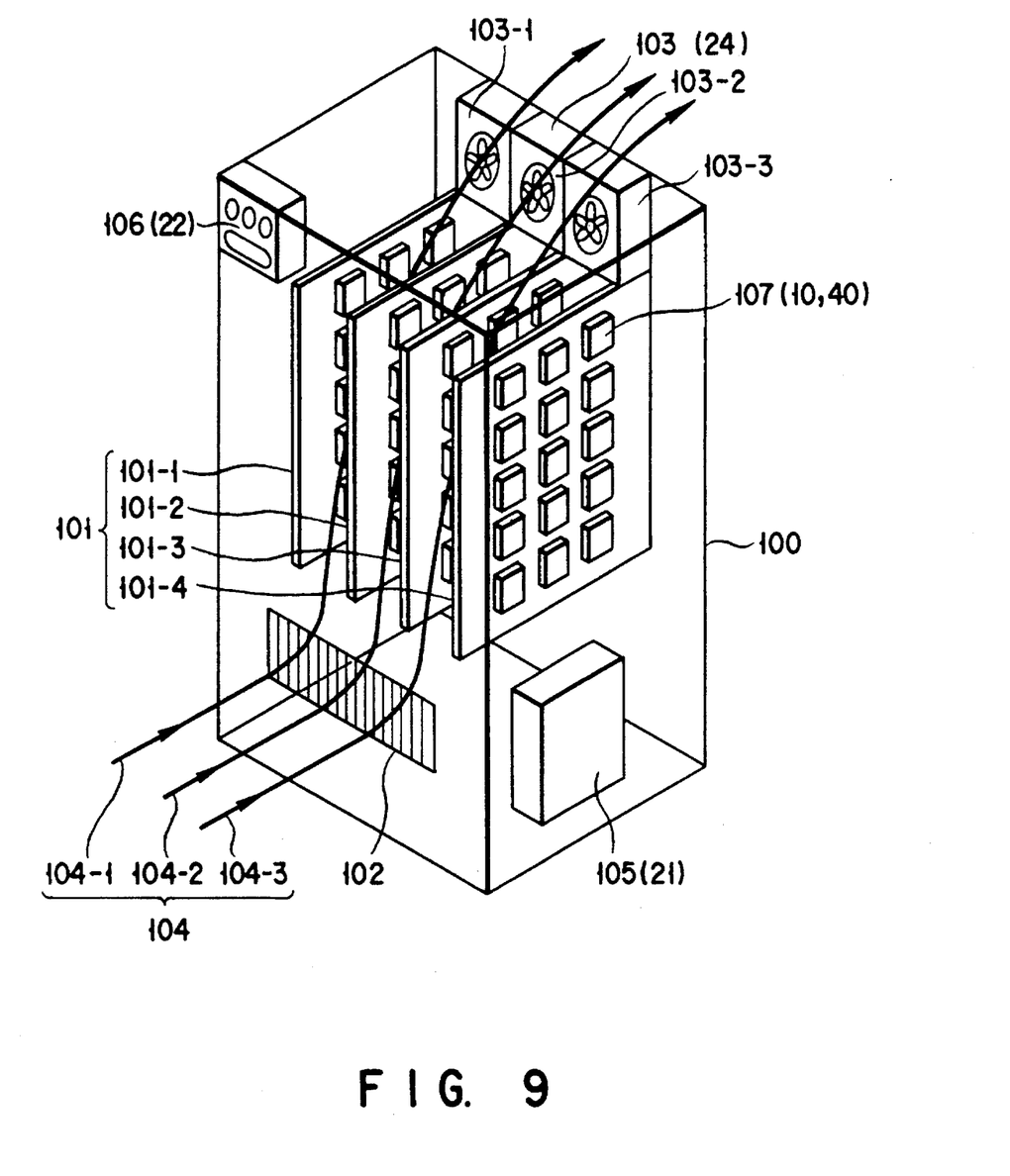
FIG. 9 is a perspective view showing the internal portion of the frame of the electronic equipment according to one embodiment of this invention.

The electronic equipment according to this invention is constructed as shown in FIG. 9. That is, a circuit board section 101 is disposed inside a frame 100. An air inlet duct 102 is formed in a front panel (not shown) which is attached to the frame 100. A fan mechanism 103 (24) is mounted on a rear panel (not shown) which is attached to the frame 100. In the frame 100, an air flow path 104 is formed between the air inlet duct 102 and the fan mechanism 103. The air flow path 104 passes through the circuit board section 101. Further, a controller 105 (21) and an alarm unit 106 (22) are arranged in the frame 100.

The circuit board section 101 includes printed wiring boards 101-1, 101-2, 101-3, 101-4. Of course, the number of printed wiring boards is not limited to four, but may be set to one or more than four. Further, the circuit board section 101 includes a large number of electronic elements (not shown). At least one of the integrated circuit elements 107 (10 or 40) shown in FIGS. 1 to 7 is mounted on at least one of the printed wiring boards 101-1, 101-2, 101-3, 101-4. The air flow path 104 includes a plurality of flow passages 104-1, 104-2, 104-3 as shown in FIG. 9. The fan mechanism 103 is provided according to the number of flow passages of the air flow path 104. For example, the fan mechanism 103 has fans 103-1, 103-2, 103-3 as shown in FIG. 9. Therefore, the magnitudes of the respective flow passages of the air flow path 104 can be freely controlled by the fans 103-1, 103-2, 103-3.

The controller 105 (21) controls the abnormal temperature detecting section 20 and determining section 21 shown in FIG. 8 as a main component. The alarm unit 106 generates an alarm sound and/or alarm display.

For example, a first example of the determining condition in the determining section 21 is that a command is output only to the alarm unit 22 when it is determined that the temperature of one of the n integrated circuit devices 10 (10-1, 10-2, - - - , 10-n) has reached an abnormal temperature based on outputs from the abnormal temperature detecting sections 20 (20-1, 20-2, - - - , 20-n) and one of the integrated circuit devices 10 whose temperature has reached the abnormal temperature is specified to display the fact that the abnormal temperature is reached. By this alarm display, the operator can take necessary actions such as interruption of the device, study of the cause of occurrence of the abnormal state, or calling of an external service man.

For example, a second example of the determining condition is that a command is output to the alarm unit 22 and fan controller 23 when it is determined that the temperatures of two or more of the n integrated circuit devices 10 (10-1, 10-2, - - - , 10-n) have reached an abnormal temperature based on outputs from the abnormal temperature detecting sections 20 (20-1, 20-2, - - - , 20-n) and corresponding ones of the integrated circuit devices 10 whose temperatures have reached the abnormal temperature are specified to display the fact that the abnormal temperature is reached and at the same time the rotation speed of the fan 24 is increased to enhance the cooling ability.

For example, a third example of the determining condition is that a command is output to the alarm unit 22 and fan controllers 23 when it is determined that the temperature of at least one important device among the n integrated circuit devices 10 (10-1, 10-2, - - - , 10-n) has reached an abnormal temperature based on outputs from the abnormal temperature detecting sections 20 (20-1, 20-2, - - - , 20-n) and the same process as those effected in the first and second examples is effected and the operation clock frequency for the CPU 25 is lowered. In this case, it is possible to effect only reduction in the operation clock frequency for the CPU 25 without effecting the process by the alarm unit 22 and fan controller 23.

Figure 10:
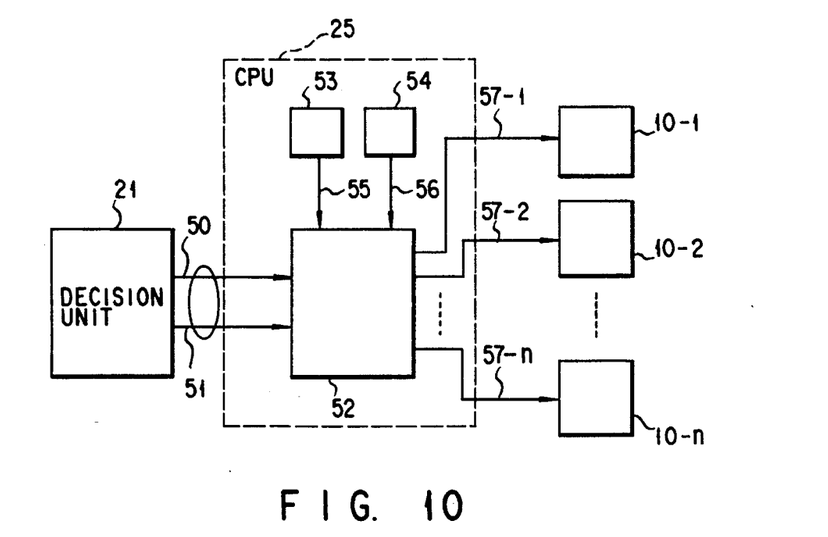
FIG. 10 is a detailed circuit diagram of the CPU depicted in FIG. 8.

A specific circuit for attaining the third example of the determining condition will be described in detail with reference to FIGS. 10 to 12. FIG. 10 is a detailed circuit diagram of the CPU depicted in FIG. 8, FIG. 11 is a detailed circuit diagram of the clock distributor depicted in FIG. 10, and FIG. 12 is a timing chart showing the signals in the circuit shown in FIG. 10.

As shown in FIG. 10, a CPU 25 comprises: a clock switching device 52 which operates on the basis of control signals 50 and 51 supplied from the decision unit 21; a clock generator 53 (e.g., a quartz oscillator) for generating clocks 55 used in a normal state of operation; and a clock generator 54 (e.g., a quartz oscillator) for generating clocks 56 used in an abnormal state of operation. Control signal 50 is a signal indicating whether the system is in a normal-frequency mode, a changing mode, or a low-frequency mode. Control signal 50 indicates that the system is in operation when it is "LOW", and indicates that the clock frequencies are being switched from one to another when it is "HIGH". Control signal 51 is a signal for switching the system from one operation mode to another. The normal-frequency mode is selected when control signal 51 is "LOW", and the low-frequency mode is selected when control signal 51 is "HIGH". The frequency F2 of the clocks 56 generated by clock generator 54 and the frequency F1 of the clocks 55 generated by clock generator 53 are determined in such a manner as to satisfy the relationship $F1 > F2$. From the clock switching device 52, the operating clocks 57-1, 57-2, - - - 57-n of frequency F1 or F2 are supplied to devices 10-1, 10-2, - - - , 10-n, respectively.

Figure 11:
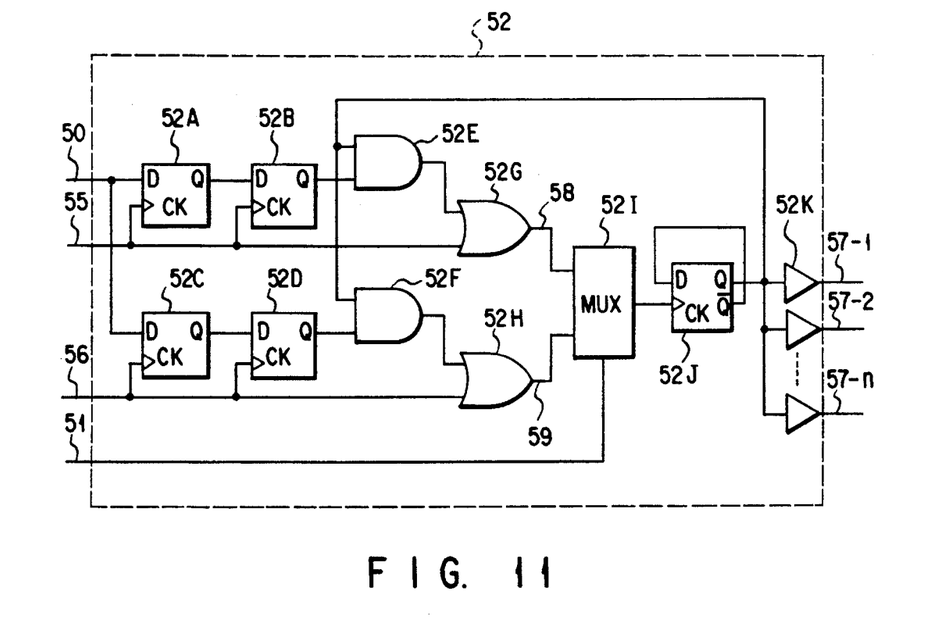
FIG. 11 is a detailed circuit diagram of the clock distributor depicted in, FIG. 10.
Figure 12:
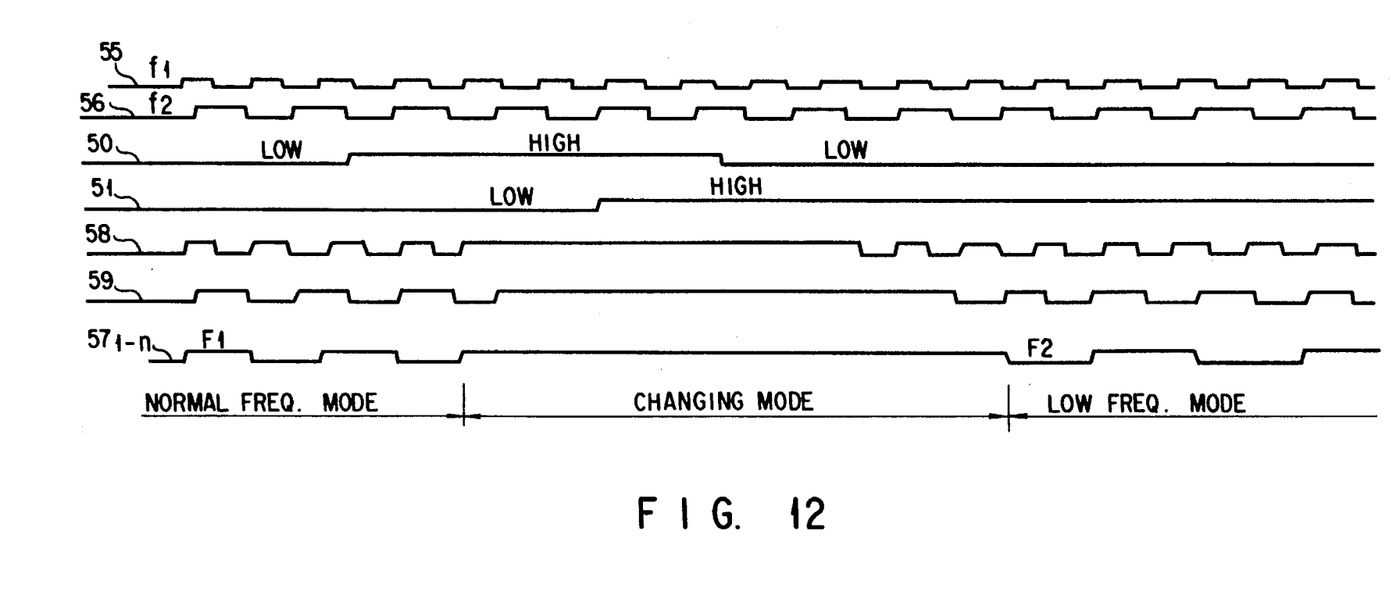
FIG. 12 is a timing chart showing the signal in the circuit shown in FIG. 10.

As shown in FIG. 11, the clock switching device 52 comprises synchronizing flip-flops 52A, 52B, 52C and 52D, AND gates 52E and 52F, OR gates 52G and 52H, a multiplexer (MUX) 52I, frequency-dividing flip-flop 52J, and a plurality of drivers 52K.

The operations of the circuits shown in FIGS. 10 and 11 will be described with reference to FIG. 12. When control signal 50 changes from "LOW" to "HIGH", the system is switched from the normal-frequency mode to the changing mode. Then, control signal 51 changes from "LOW" to "HIGH", and the frequency of the operating clocks 57-1, 57-2, - - -, 57-n changes from F1 to F2. As a result, the system is set in the low-frequency mode. The timing chart in FIG. 12 illustrates the case where the clock frequency F2 used in the low-frequency mode of the system is obtained by frequency division and is 1/2 of clock frequency F1.

The determining conditions described above are only examples, and various different determining conditions for alarm, cooling ability, operation frequency, interruption of the operation of the device can be set according to the number of integrated circuit devices 10 whose temperatures reach the abnormal temperature, the type and the position thereof.

Figure 13:
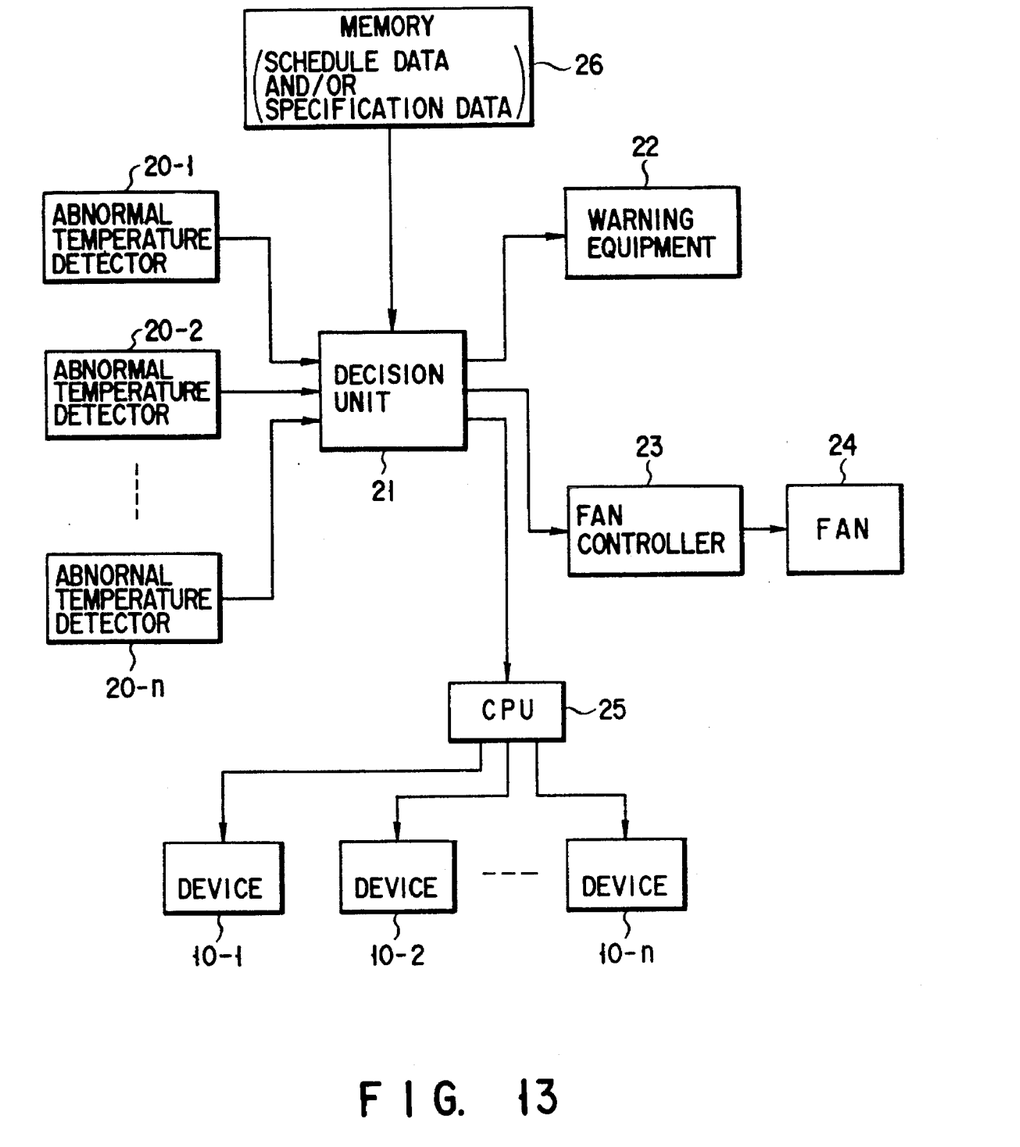
FIG. 13 is a circuit diagram showing the main portion of an electronic equipment according to another embodiment of this invention.

Next, an electronic equipment of this invention different from that of FIG. 8 is explained with reference to FIG. 13. The determining section 21 in the electronic equipment of this invention shown in FIG. 8 determines a plurality of determining conditions based on only outputs of the abnormal temperature detecting sections 20. A determining section 21 in the electronic equipment of this invention shown in FIG. 13 determines a plurality of determining conditions based on outputs of the abnormal temperature detecting sections 20 and data stored in a memory 26. Data stored in the memory 26 includes schedule data indicating the schedule of signal processings effected by the electronic equipment, and specification data indicating the software specification and hardware specification of the electronic equipment. Thus, the determining section 21 can attain various temperature control operations by determining a plurality of determining conditions based on outputs of the abnormal temperature detecting sections 20 and data stored in the memory 26.

As described above, according to the electronic equipment of this invention, when the temperature sensing element 14 senses temperatures higher than a preset temperature and exhibits a large resistance variation, a measure is taken to cope with the abnormal temperature state for a corresponding one of the integrated circuit devices 10. Therefore, in a case where the performance of the device is degraded or it is erroneously operated, whether or not the above abnormal condition is caused by the abnormal temperature of the integrated circuit element can be rapidly determined and an adequate after-treatment can be effected.

Generally, in the above-described electronic equipment, highly heat generating elements and non-highly heat generating elements are arranged together, and in such a case, it is generally required to effect the temperature control with the highly heat generating elements treated as main objects. When the highly heat generating element is constructed as the integrated circuit device 10 using the temperature sensing element 14 according to this invention and it is detected that the temperature of the highly heat generating element becomes abnormal temperature, only a fan that is disposed near the element can be controlled. As a result, the non-highly heat generating elements and the elements whose temperature does not reach the abnormal temperature can be prevented from being excessively cooled and the fans can be efficiently driven, thus enhancing energy saving.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic device comprising:

a circuit board section for effecting a preset signal process including at least one integrated circuit device including a package, an integrated circuit chip disposed in said package, a PTC (Positive Temperature Coefficient) thermistor disposed between said package and said integrated circuit chip and outputting a temperature change signal in the form of a resistance change, and an electrical deriving member disposed in said package and effecting signal transfer with respect to said integrated circuit chip and said PTC thermistor;

temperature controlling means for controlling the temperature of said circuit board section; and control means for controlling at least one of said temperature controlling means and circuit board section according to an output of said PTC thermistor, wherein said temperature controlling means includes a refrigerant; cooling system including a refrigerant inlet duct, a refrigerant flowing path, and a forced exhaust fan mechanism controlled by said control means based on an output of said PTC thermistor, and an alarm unit controlled by said control means based on an output of said thermistor; and said control means includes storing means for storing at least one of schedule data indicating a signal processing schedule effected in said circuit board section and specification data indicating the software specification and hardware specification of said circuit board section, and means for identifying an abnormal temperature state in said circuit board section and an abnormal temperature state of said integrated circuit device based on an output of said PTC thermistor and at least one of the schedule data and specification data.

2. An electronic device according to claim 1, wherein said control means further includes an abnormal temperature detecting section for outputting an abnormal temperature signal when an output of said PTC thermistor has exceeded a preset value, and a determining section for determining an abnormal state of said integrated circuit device according to an output of said abnormal temperature detecting section and supplying a control signal to at least one of said temperature controlling means and said circuit board.

3. An electronic device comprising:

a circuit board section for effecting a preset signal process including at least one integrated circuit device including a package, an integrated circuit chip disposed in said package, a PTC (Positive Temperature Coefficient) thermistor disposed between said package and said integrated circuit chip and outputting a temperature change signal in the form of a resistance change, an abnormal temperature detecting chip for outputting an abnormal temperature signal when an output of said PTC thermistor has exceeded a preset value, and an electrical deriving member disposed in said package and effecting signal transfer with respect to said integrated circuit chip, PTC thermistor and abnormal temperature detecting chip;

temperature controlling means for controlling the temperature of said circuit board section; and determining means for determining at least one abnormal temperature state in said circuit board section and an abnormal temperature state of said integrated circuit device according to an output of said abnormal temperature detecting chip and controlling at least one of said temperature controlling means and said circuit board section;

wherein said temperature controlling means includes a refrigerant cooling system including a refrigerant inlet duct, a refrigerant flowing path, and a forced exhaust fan mechanism controlled by said control means based on an output of said PTC thermistor, and an alarm Unit controlled by said control means based on an output of said thermistor; and said determining means includes storing means for storing at least one of schedule data indicating a signal processing schedule effected in said circuit board section and specification data indicating the software specification and hardware specification of said circuit board section, and means for identifying at least one abnormal temperature state in said circuit board section and an abnormal temperature state of said integrated circuit device based on an output of said PTC thermistor and at least one of the schedule data and specification data.

4. An electronic device comprising:

a circuit board section for effecting a preset signal process including at least one integrated circuit device including a package, an integrated circuit chip disposed in said package, a PTC (Positive Temperature Coefficient) thermistor disposed between said package and said integrated circuit chip, and an electrical deriving member disposed in said package and transferring a signal with respect to said integrated circuit chip and PTC thermistor;

an abnormal temperature detecting section for outputting an abnormal temperature signal when an output of said PTC thermistor has exceeded a preset value;

a determining section for determining an abnormal state of said integrated circuit device according to an output of said abnormal temperature detecting section;

a refrigerant cooling system including a refrigerant inlet duct, a refrigerant flowing path, and a forced exhaust fan mechanism controlled by said determining section;

an alarm unit controlled by said determining section;

storing means for storing at least one of schedule data indicating a signal processing schedule effected in said circuit board section and specification data indicating the software specification and hardware specification of said circuit board section; and means for determining at least one of an abnormal temperature state in said circuit board section and an abnormal temperature state of said integrated circuit device based on an output of said abnormal temperature detecting section and at least one of the schedule data and specification data.

5. An electronic device according to claim 4, wherein said abnormal temperature detecting section is disposed in said package.

* * * * *